J. H. WAITE.
LUGGAGE BOX FOR VEHICLES.
APPLICATION FILED MAR. 11, 1911.

1,049,951.

Patented Jan. 7, 1913.

2 SHEETS—SHEET 1.

Witnesses:

Inventor:
James H. Waite
by Chas. F. Perkins Attorney

J. H. WAITE.
LUGGAGE BOX FOR VEHICLES.
APPLICATION FILED MAR. 11, 1911.

1,049,951.

Patented Jan. 7, 1913.

2 SHEETS—SHEET 2.

Witnesses:

Inventor:
James H. Waite
by Chas. F. Perkins Attorney

UNITED STATES PATENT OFFICE.

JAMES H. WAITE, OF MALDEN, MASSACHUSETTS.

LUGGAGE-BOX FOR VEHICLES.

1,049,951. Specification of Letters Patent. Patented Jan. 7, 1913.

Application filed March 11, 1911. Serial No. 613,862.

*To all whom it may concern:*

Be it known that I, JAMES H. WAITE, a citizen of the United States, residing at Malden, in the county of Middlesex and State of Massachusetts, have invented new and useful Improvements in Luggage-Boxes for Vehicles, of which the following is a specification.

My invention relates to tool or luggage boxes for use in motor or similar vehicles, and its object is to provide increased capacity for carrying articles of all descriptions upon motor vehicles.

My invention consists of a box hinged to the under side of the body of the car, largely concealed in its normal position, constructed so as to be dust and moisture proof, and readily accessible for use. Two of said boxes may be readily used, located one on either side of the differential, over the rear axle of the automobile.

The usual methods now in use for carrying tools and accessories are to place the same under the seats of the vehicle or in a box provided for that purpose on the step of the car. These means of carrying such articles occupy space which it is desirable to use for carrying articles for the personal comfort and convenience of passengers, and for carrying articles such as curtains which are injured and defaced by contact with tools and hardware.

My invention is illustrated in the accompanying drawing in which similar numerals of designation refer to similar parts throughout the several views.

Figure 1:
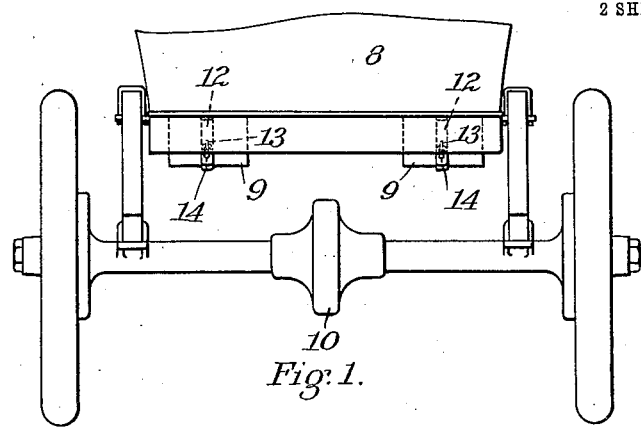
Figure 2:
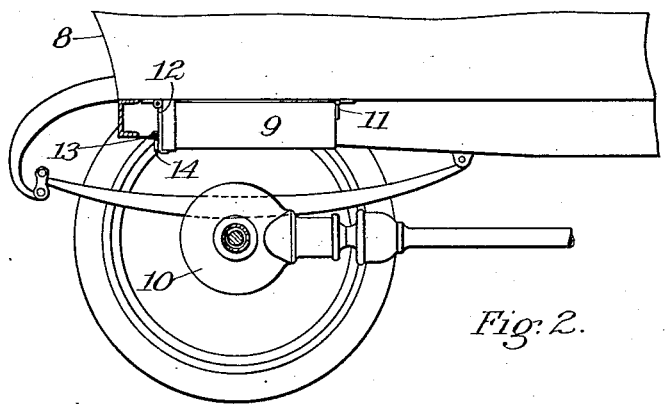
Figure 3:
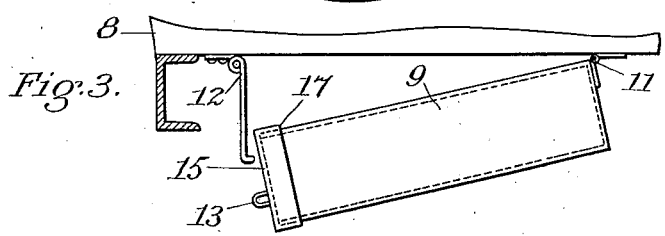
Figure 4:
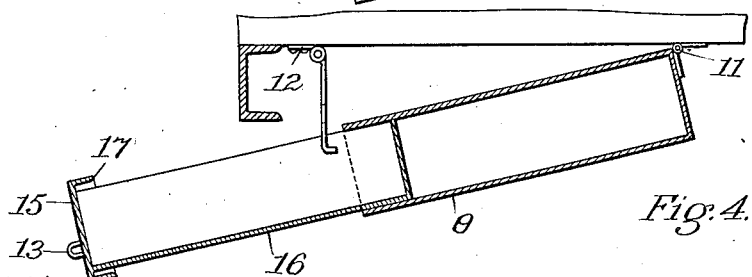
Figure 5:
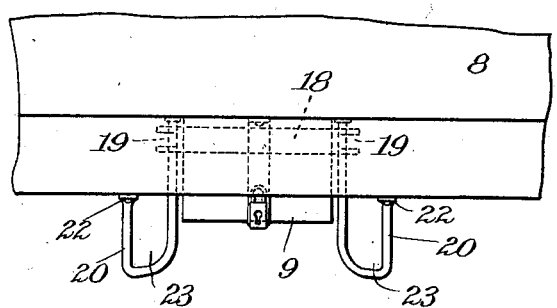
Figure 6:
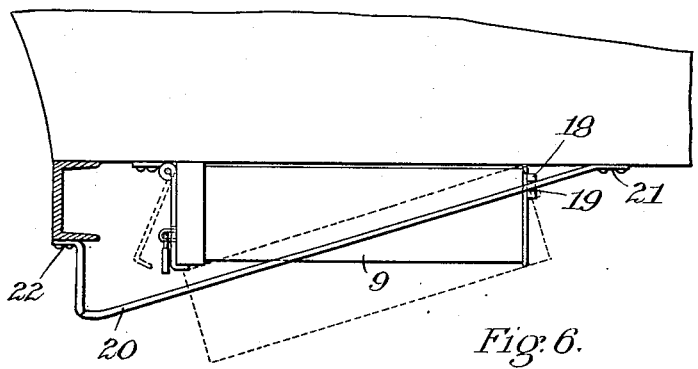
Figure 7:
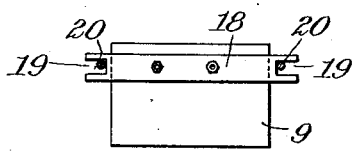

Figure 1 is a rear elevation of an automobile body, showing the boxes projecting slightly below the frame. Fig. 2 is a side elevation of the frame of an automobile, showing my invention in its normal position. Fig. 3 is the same view as Fig. 2, except that the box is shown in a position to allow the drawer to be opened. Fig. 4 is the same as Fig. 3 with the drawer open. Figs. 5, 6 and 7 show a modification of the means for pivoting and supporting the box shown in Fig. 2.

Referring to the drawing, 8 is the rear end of an automobile. 9 is a box extending slightly below the frame thereof on either side of the differential 10 but not visible to one standing on the ground.

11 is the hinge by which the box is pivoted to the floor.

12 is a hasp or hook of any suitable form to support the box or carrier when in its normal position. The hasp 12 is adapted to fit over the staple 13, by means of which and the padlock 14, the box may be securely locked and its contents protected.

The front end 15 of the drawer 16 projects beyond the walls of the box on all sides, and is provided with a flange 17 which fits snugly over the end of the box when the drawer is closed and forms a tight cover therefor.

To open the box the hasp 12 is released, which permits the front of the box to drop below the frame of the car. The drawer 16 may then be pulled out so that its contents are easily accessible.

Referring to Figs. 5, 6, and 7, I have illustrated a modification of the means for pivoting and supporting the box shown in the other figures of the drawing, which consists of the metal strap or casting 18, secured to the rear end of the box 9 in the opposite ends of which strap 18 are slots 19 which engage with the wire rods 20 on which the box slides. The rods 20 have flattened inner ends 21 which are fastened to the under side of the floor of the car, and have their outer ends 22 secured to the sill of the car. The outer ends 22 of the rods 20 are bent outwardly and upwardly to permit the box to be slipped off the rods and withdrawn completely from beneath the car, if desired, and as generally preferred. By this arrangement the outer end of the box may be dropped down and made accessible while wholly beneath the car or projecting therefrom to any desired extent. It will be noticed that the converging space between the rods 20 and the bottom of the car enables the box to be crowded against the bottom of the car as it is pushed back into place, and thereby it is firmly held against the vibration and shaking motion of the car.

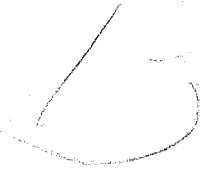

What I claim and desire to secure by Letters Patent is:—

1. In a luggage box for vehicles, the combination with inclined rods secured to the floor of the vehicle and having their outer ends bent outwardly and upwardly, of a receptacle having slotted arms secured to one end thereof and engaging said rods.

2. In a luggage box for vehicles, the combination with a receptacle, of means for pivotally connecting one end of said receptacle to the underside of a vehicle floor, a hasp carried by said floor and provided with a hook-like portion for engaging the other end of said receptacle to normally support the latter in a horizontal position.

In testimony whereof I have hereunto set my hand in presence of two subscribing witnesses, this seventh day of March, 1911.

JAMES H. WAITE.

Witnesses:
ELMER L. BRIGGS,
ALICE G. SULLIVAN.

Copies of this patent may be obtained for five cents each, by addressing the "Commissioner of Patents, Washington, D. C."